UNITED STATES PATENT OFFICE.

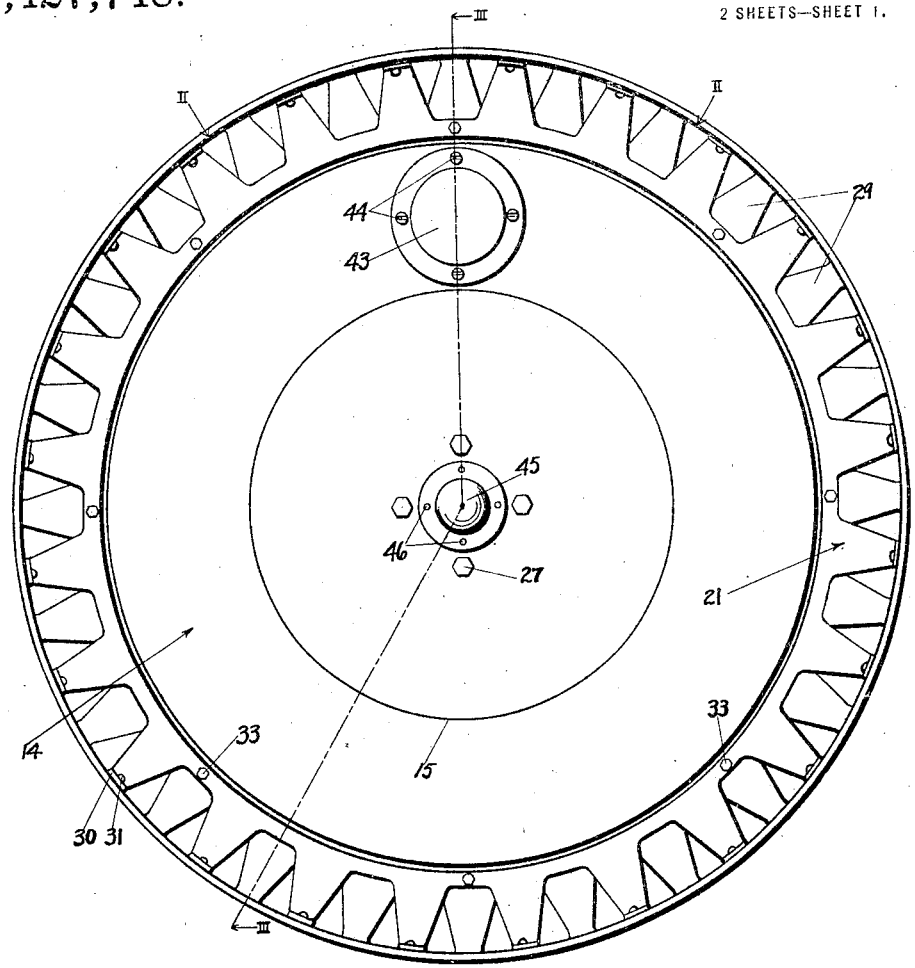
Fig. I.
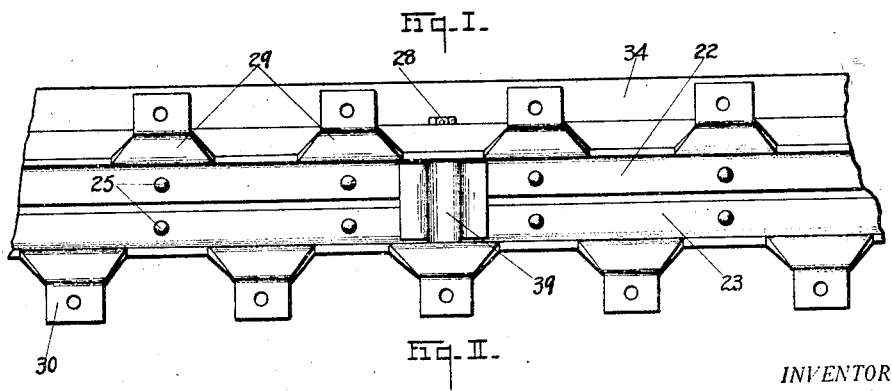
Fig. II.
INVENTOR.
Joseph Ledwinka
BY Chester W. Braselton
ATTORNEY.

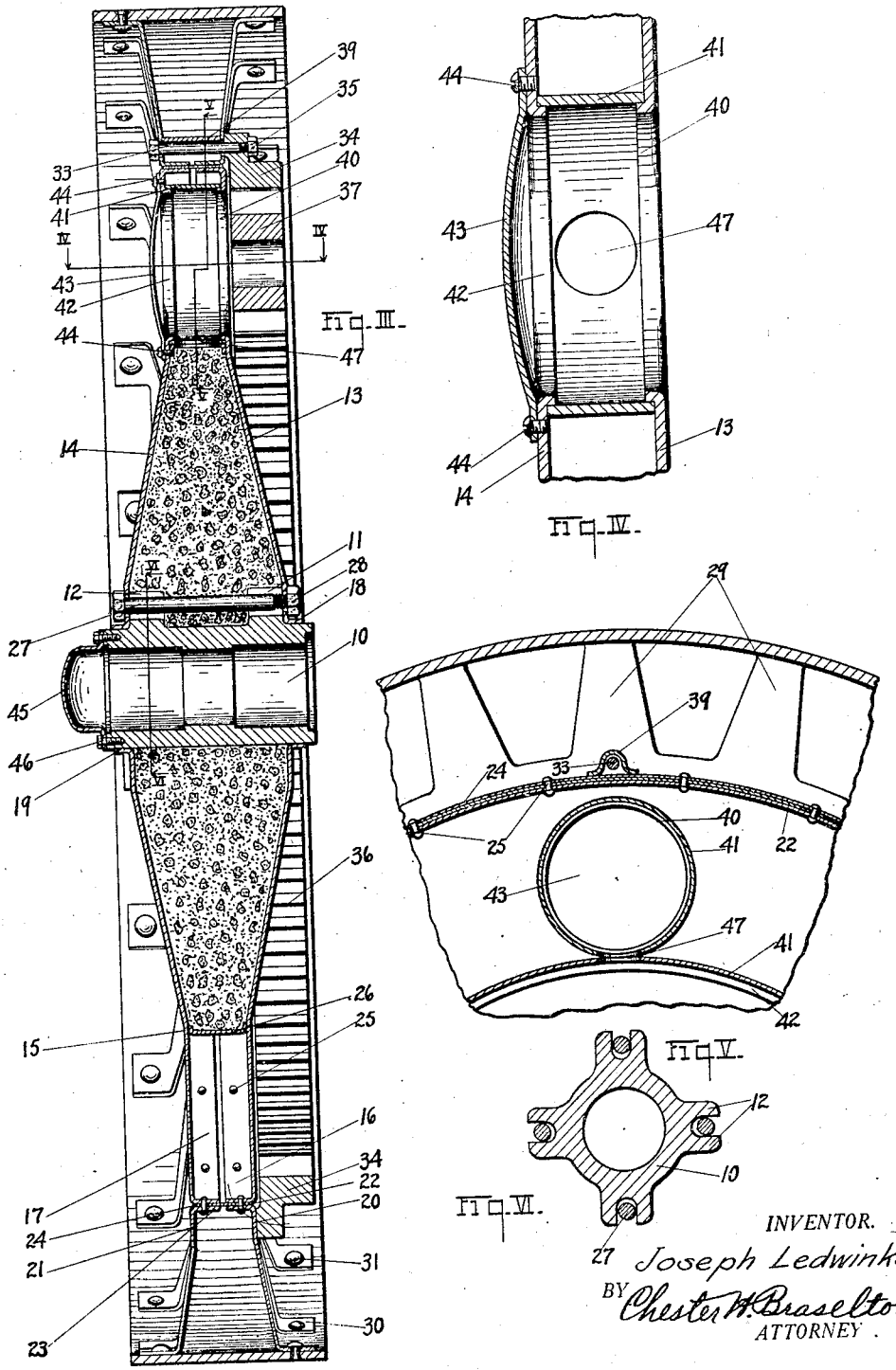

JOSEPH LEDWINKA, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

WHEEL.

1,427,748.              Specification of Letters Patent.     Patented Aug. 29, 1922.

Application filed May 17, 1919. Serial No. 297,843.

*To all whom it may concern:*

Be it known that I, JOSEPH LEDWINKA, residing at Philadelphia, county of Philadelphia, Pennsylvania, have invented certain new and useful Improvements in Wheels, of which I declare the following to be a full, clear, and exact description.

This invention relates to improvements in wheels, and particularly to wheels which are adapted for use in connection with trucks, tractors and the like.

One object of the invention is to provide a wheel of this character, which is of simple construction and efficient in operation.

A further object of the invention is to provide an improved form of disc wheel, which is provided with a filler portion adapted to give strength and rigidity to the wheel and to increase the weight thereof.

A further object of the invention is to provide an improved form of truck wheel having an interior disc portion and an outer bracing portion for securing the disc portion to the tire.

A further object of the invention is to provide a wheel of this character having certain novel features of construction which will be more fully described hereinafter.

Further objects of this invention relate to economies of manufacture and details of construction as will appear from the detailed description to follow.

The objects of the invention are accomplished in one instance by the devices and means described in the following specification, but it is evident that the same may be varied widely without departing from the scope of the invention, as pointed out in the appended claims.

A structure constituting one embodiment of the invention, which may be the preferred, is illustrated in the accompanying drawings forming a part hereof, in which:

Fig. I is a side elevational view of a wheel embodying the present invention.

Fig. II is a detail top view of the wheel structure, with the rim removed.

Fig. III is a transverse-sectional view, taken along the line III—III of Fig. I, and showing the relative position of the various parts of the wheel structure with respect to each other.

Fig. IV is a detail sectional view, taken along the line IV—IV of Fig. III, and illustrating the spacing plate positioned within the registering openings formed in the wheel discs, and the removable cover therefor.

Fig. V is a detail sectional view taken along the line V—V of Fig. III, and illustrating the manner of securing the outer peripheral portions of the wheel discs to the annular bracing members.

Fig. VI is a detail sectional view, taken along the line VI—VI of Fig. III, and illustrating the relative location of the outwardly extending spaced ears formed upon the hub member.

Referring to the drawings, similar reference characters designate corresponding parts through the several views, and the sectional views are taken looking in the direction of the small arrows at the ends of the section lines.

In the embodiment of the invention illustrated herewith, the wheel comprises a tubular hub member 10 provided with a plurality of pairs of radially extending oppositely positioned ears 11 and 12 located at opposite ends of the hub member, and extending radially therefrom for a purpose which will be hereinafter described. A pair of wheel discs 13 and 14 of similar construction are each provided with a central opening within which is positioned the hub 10, and the discs extend radially therefrom and converge towards each other to a point indicated by the number 15, which is located substantially midway between the outer surface of the hub and the inner surface of the rim. From the point 15 the wheel discs extend outwardly a short distance substantially parallel to each other, and are provided upon their outer peripheries with inturned flanges 16 and 17 respectively. The wheel disc 13 is provided with an annular flange 18 surrounding the central opening formed therein, said flange being formed in such a manner as to bear against and be supported by the outer circumferential face of the hub 10. Positioned upon the outer peripheral edge portion of the disc 13 is the annular inturned flange 16 above referred to. The wheel disc 14 is provided with an annular flange 19 surrounding the central opening therein, which is similar in all respects to the flange 18 formed upon the wheel disc 13, and is adapted to bear in a similar manner against the outer circumferential face of the wheel hub. It will be noted that the wheel discs 13 and 14 terminate short of the inner circumferential surface of the rim to which they are adapted to be secured by means of a pair of similarly constructed annular bracing members 20 and 21.

The annular bracing member 20 is provided with an inturned annular flange 22, which extends in a direction substantially parallel to the axis of the wheel, and is adapted to be connected to the peripheral flange 16 formed upon the wheel disc 13. In a similar manner the annular bracing member 21 is provided with an inwardly extending annular flange 23, which is adapted to be connected to the inwardly extending peripheral flange 17 formed upon the wheel disc 14. A circular band 24 is positioned between the inturned peripheral flanges 16 and 17 formed upon the wheel discs, and the inturned annular flanges 22 and 23 formed upon the bracing members, and the several parts are firmly secured together by means of a plurality of rivets or suitable fastening means 25 spaced from each other circumferentially of the inturned peripheral flanges formed upon the wheel discs.

A spacing ring 26 is inserted between the discs in such a manner as to be substantially concentric with the axis of the wheel and is located along the line where the discs cease to converge. This spacing ring may be held in position with respect to the discs in any suitable manner and its presence forms a central compartment between the discs and adjacent to the hub portion. Each of the discs is provided with a plurality of registering openings positioned adjacent their points of bearing upon the hub, and a plurality of bolts 27 are passed through the registering openings and between the oppositely positioned pairs of ears 11 and 12 formed upon the hub and secured in place therein by nuts 28 threaded thereon. These bolts 27 serve to retain the wheel discs in proper position relative to each other and to the hub member. Each of the annular bracing members 20 and 21 is provided with a plurality of outwardly extending bracing portions 29, each of which is provided with an out-turned edge portion 30. The several out-turned edge portions 30 are each secured to the rim by means of a rivet 31 or other suitable fastening means.

Oppositely positioned registering openings are formed in the annular members 20 and 21 near the inturned annular flanged portions 22 and 23 thereof, which are adapted to receive bolts 33 passed therethrough. A gear ring 34 is positioned concentric with the axis of the wheel and located in such a manner as to bear against the outer surface of the annular bracing member 20, the said bracing members and the gear ring being suitably secured in position relative to each other by means of the bolts 33 positioned in registering openings formed in these parts, each of the bolts being provided with a nut 35 threaded thereon. The gear ring 34 is provided with internal gear teeth 36 formed thereon, and a pinion 37 carried by the driving shaft (not shown) is adapted to mesh with the internal gear 36 in such a manner as to drive the wheel. Spacing plates 39 are positioned between the annular bracing members 20 and 21 adjacent each of the bolts 33 in such a manner as to partially surround each of the bolts and space the annular bracing members 20 and 21 from each other.

A pair of registering openings 40 are formed in the wheel discs 13 and 14 positioned in such a manner as to register with each other when the discs are in assembled position, and located at a point adjacent the inner circumference of the gear 36. A spacing sleeve 41 is positioned between the wheel discs in such a manner as to have the interior portion thereof co-incide with the openings formed in the wheel discs whereupon the edge portions of the wheel discs adjoining the openings 40 formed therein are bent inwardly to form flanges 42 extending inwardly towards the center of the wheel and bearing against the inner edge portions of the sleeve 41. A cover 43 is provided for attachment to the outer wheel disc in such a manner as to extend over the openings 40 formed in the wheel discs, and screws 44 are provided for detachably securing the cover plate 43 to the wheel disc 14. The cover is capable of being readily and easily removed from the wheel disc upon detachment of the screws 44, thus exposing the openings 40 formed in the wheel discs and permitting the removal therethrough of the pinion 37 together with the driving shaft (not shown) by which the same is carried. The pinion 37 is adapted to drive the wheel through engagement with the internal gear 36, and the opening 40 formed in the wheel disc provides a ready means for easily removing the driving pinion and the shaft by which the same is carried whenever it is deemed desirable to remove the same for the purpose of replacement or repairs, without the necessity of previously removing the wheel from the axle.

A dust cap 45 is secured to the outer end portion of the hub 10 by means of a plurality of attaching screws 46 and serves to inclose the axle bearings and prevent the access of foreign matter thereto.

The interior space between the wheel discs and adjacent the hub may be filled with concrete or other suitable material, which in its original state is plastic so as to enable the same to be readily inserted within the space. The concrete or other suitable material is adapted to be inserted into the inner circular space formed between the wheel discs by being passed through an opening 47 formed in the spacing sleeve 41 and ring 26 and communicating with the interior space formed between the wheel discs. The insertion of material of this character serves to give added strength and rigidity to the wheel structure, and also gives added weight thereto. The object of the insertion of concrete or other suitable material within the inner portion of the wheel disc is to provide a means for giving one of the wheels when applied to a tractor structure a greater weight than the other and consequently equalize the tractive force exerted by the wheels when they are positioned at unequal distances from the center line of the tractor. In the form of tractor wherein this type of wheel is particularly adapted for use to obtain the result mentioned above, one wheel of the tractor is offset transversely from the central longitudinal line of the tractor a greater distance than the other, thus rendering it desirable to give the wheel located farthest from the center line of the tractor greater weight than the wheel located nearest thereto, in order to prevent the side slip and cause the two wheels to act uniformly in exerting tractive force. When the type of wheel illustrated herewith is employed in connection with a tractor of the character described, it is desirable to place concrete or other suitable plastic material of like character within the central portion of the wheel which is positioned farthest from the center line of the tractor, so as to give that wheel greater weight than the oppositely positioned wheel and thus increase its traction.

While the type of wheel illustrated herewith is particularly adapted for use in this connection, since from its construction ready means is provided for increasing the weight of one of the wheels over that of an oppositely positioned wheel, it is to be understood that this type of wheel may be employed with equal readiness for all of the various purposes for which wheels of this general type are ordinarily employed.

While I have shown and described in considerable detail a specific embodiment of my invention, it is to be understood that this showing and description is illustrative only and for the purpose of rendering my invention more clear and that I do not regard the invention as limited to the details of construction illustrated or described, nor any of them except in so far as I have included such limitations within the terms of the following claims, in which it is my intention to claim all novelty inherent in my invention broadly as well as specifically.

What I claim as new and desire to secure by Letters Patent is:

1. In a wheel structure, a hub, a rim, a pair of wheel discs spaced from each other throughout a portion of their extent, a filler portion of heavy material surrounding the hub, and bracing means separate from the wheel discs and positioned between the outer circumferential portions thereof and the inner surface of the tire.

2. In a wheel structure, a hub, a rim, a pair of wheel discs surrounding the hub and provided with registering openings therein, a driving gear concentric with the axis of the wheel, the registering openings in the wheel discs being adjacent the toothed surface of the driving gear, and brace members surrounding the wheel discs and connecting the same to the rim.

3. In a wheel structure, a hub, a rim, a wheel disc surrounding the hub and provided with an opening therein, a driving gear concentric with the axis of the wheel, the opening formed in the wheel disc being positioned adjacent the toothed surface of the driving gear, and brace members surrounding the wheel disc and connecting the same to the rim.

4. In a wheel structure, a hub, a rim, a driving gear concentric with the axis of the wheel, a wheel disc surrounding the hub and provided with an opening therein, the opening formed in the wheel disc being positioned adjacent the toothed surface of the driving gear, brace members surrounding the wheel disc and connecting the same to the rim and a removable cover for the opening.

5. In a wheel structure, a hub, a rim, a pair of wheel discs surrounding the hub and extending outwardly therefrom, each of the discs being provided with an inturned peripheral flange, and annular bracing members provided with portions bearing against the peripheral flanges of the discs and having portions bearing against and secured to the inner surface of the rim.

6. In a wheel structure, a hub, a rim, a pair of wheel discs extending outwardly from the wheel hub and provided with inturned peripheral flanges, and bracing members positioned between the inturned peripheral flanges of the wheel discs and the inner surface of the rim and supporting the wheel discs.

7. In a wheel structure, the combination of a hub, a rim, a wheel disc mounted on said hub, an annular bracing member disposed between said disc and rim, and a driving gear concentric with said wheel and mounted on said bracing member adjacent the periphery of said disc.

8. In a wheel structure, a hub, a rim, a pair of wheel discs mounted on said hub, a ring interposed between said discs and forming a chamber around the hub, and bracing members interposed between the peripheries of the discs and said rim.

9. In a wheel structure, a hub, a rim, a wheel disc mounted on said hub and having a peripheral flange, and an annular member mounted on said flange and having a plurality of feet secured to said rim.

10. In a wheel structure, a hub, a rim, a pair of wheel discs mounted on said hub and each having a peripheral flange, and a pair of annular members mounted on said flanges and provided with a plurality of feet connected to the rim adjacent the edges thereof.

11. In a wheel structure, a hub, a rim, a pair of wheel discs mounted on said hub and comprising inner converging portions, outer parallel portions and peripheral flanges, and an annular bracing member interposed between and connected to said flanges and the rim.

12. In a wheel structure, a hub, a rim, a pair of wheel discs mounted on said hub and comprising inner converging portions, outer parallel portions and peripheral flanges, a ring interposed between the discs adjacent the inner edges of said parallel portions, and an annular bracing member interposed between said flanges and the rim.

13. In a wheel structure, a hub, a rim, a pair of wheel discs mounted on said hub and comprising inner converging portions, outer parallel portions and peripheral flanges, an annular bracing member interposed between said flanges and the rim, a gear secured to said member, said discs having registering openings formed in the parallel portions thereof adjacent the toothed surface of said gear.

14. In a wheel structure, a hub, a rim, a pair of wheel discs mounted on said hub and provided with registering openings in the outer portions thereof, a ring interposed between said discs and enclosing a space around the hub, an annular bracing member interposed between the rim and the peripheries of said discs, and a gear secured to said member with its toothed surface contiguous to said openings in the discs, said ring having an opening therein communicating with the openings in said discs.

15. In a wheel structure, a hub, a rim, a pair of wheel discs mounted on said hub, and comprising inner converging portions, outer parallel portions and peripheral flanges, a ring interposed between the discs adjacent the inner edges of said parallel portions and forming a chamber around the hub, said ring having an opening therein, a filling of relatively heavy material introduced into said chamber through said opening, and an annular bracing member interposed between the rim and said flanges, one of said discs being provided with an opening in the parallel portion thereof communicating with the opening in said ring.

In testimony whereof, I affix my signature.

JOSEPH LEDWINKA.